United States Patent [19]

Ortabasi

[11] 4,116,225
[45] Sep. 26, 1978

[54] SOLAR ENERGY COLLECTOR

[75] Inventor: Ugur Ortabasi, Corning, N.Y.

[73] Assignee: Corning Glass Works, Corning, N.Y.

[21] Appl. No.: 813,545

[22] Filed: Jul. 7, 1977

[51] Int. Cl.² .............................................. F24J 3/02
[52] U.S. Cl. ..................................... 126/271; 126/270
[58] Field of Search ............................... 126/270, 271

[56] References Cited
U.S. PATENT DOCUMENTS

| 1,801,710 | 4/1931 | Abbot | 126/271 |
| 3,012,294 | 12/1961 | Waldor | 126/270 |
| 4,016,860 | 4/1977 | Moan | 126/271 |

Primary Examiner—Carroll B. Dority, Jr.
Attorney, Agent, or Firm—John P. DeLuca; Burton R. Turner; Clarence R. Patty, Jr.

[57] ABSTRACT

A solar energy collector structure has been provided which comprises a plurality of at least partially evacuated tubular members arranged in a group and closely packed in parallel axial alignment. The tubular members are joined together to form a tube sheet. A pair of such tube sheets are placed in tandem with a pair of opposite margins thereof being sealed, one to the other, to form a flow channel therebetween. An absorber, disposed between the tube sheets, in the flow channel, intercepts and absorbs solar energy, which by heat transfer is carried off by a working fluid in the heat exchange relation with the absorber surface.

37 Claims, 12 Drawing Figures

SOLAR ENERGY COLLECTOR

BAKCKGROUND OF THE INVENTION

The present invention relates to apparatus adapted for the collection of solar radiation and particularly relates to nontracking, "flat plate" type devices.

A typical flat plate solar collector of the prior art consists generally of an open box-like structure having insulated back and side members and a single or double pane window or cover sheet (usually glass) adapted to cover the open side of the box. A black absorber of some appropriate material is disposed within the structure for absorbing incident solar radiation which passes through the window. Inlets and outlets are provided for passing a working fluid in heat exchange relation with the black absorber surface for removing sensible heat from the collector surface. The heated working fluid may be thereafter utilized in any number of different heating and storage arrangements.

In a typical collector of the prior art, the black absorber may be a sheet of material, usually metal, which is painted black or otherwise treated with appropriate chemicals to render the surface highly absorbent to incident radiation. The absorber surface may be one of the selective types, which exhibits a high absorptivity $\alpha$ (low reflectance) characteristic to incident visible radiation and has reasonably low emissivity $\epsilon$, so that a high percentage of incident solar radiation is absorbed with low re-radiation to the ambient conditions. A typical window, which intercepts the incident solar radiation, being a double pane arrangement of clear glass or plastic, with an air space therebetween, provides some insulation from the ambience. The aforementioned arrangement may improve the efficiency of the collector considerably. By its nature, however, it has an upper limit of efficiency, due to residual convection loss caused by circulating air between the panes, conduction through the air and window, and radiation from the absorber.

The efficiency of such flat plate collectors would be enhanced further by evacuation of the air space between the panes. Conventional flat plates, with large cover sheets of glass do not lend themselves to evacuation due to the inherent weakness in glass strength caused by tensile stress under one-sided vacuum. One way to avoid this strength problem is to use a cylindrically shaped glass envelope to maintain vacuum around an absorber disposed therein. Because glass is strong under compression and due to the compressive nature of such stresses, glass tubing, even with very thin walls, can constitute an ideal structure for an evacuated collector. While plastic might be used, problems of window collapse and water diffusion limit the effectiveness of plastic, most probably to tubular arrangements with low quality vacuum.

In a typical evacuated collector of the type just described, an absorber surface gives up heat to a working fluid passing in heat exchange relation with the absorber. The working fluid may be passed through a U-tube attached to the absorber and connected to a manifold through the tube walls. Such an arrangement, while highly efficient, is costly, since high quality vacuum and glass-to-metal seals are expensive to produce and maintain. Furthermore metal components (usually copper or aluminum) are fabricated from strategic and energy intensive materials.

Another type of collector uses a double wall vacuum bottle as a window. The internal concentric wall of the bottle acts as an absorber, or alternatively an absorber plate is a concentric metal element sleeved within the bottle. Working fluid is passed in heat exchange relation with the absorber in either open or closed circuit relation. Such systems, while effective, suffer from high cost, problems with manifolding, and does not lend itself to high speed manufacturing technology.

In a closed system mentioned above, tubes or conduits, in intimate contact with the absorber surface, carry the working fluid (usually liquid). In an open system, working fluid may be trickled over the absorber surface in an open channel or direct contact arrangement. Such structures must be sealed in order to weatherproof and/or maintain vacuum of the system for proper functioning. Furthermore, if a closed system with liquid working fluid is utilized, the fluid must be chosen to reduce the possibility of freezing when the system is not in use (e.g. nights and cold cloudy days), or boiling leading to overpressure when the heat is not being used.

While, the climatic factors of the environment where the collector is to be used, the fuel type to be replaced by the collector and the energy load characteristics (e.g. hot water, heating, cooling) are important considerations when evaluating the design of a solar collector, by far the most important feature to consider is the solar system cost and the solar system performance. If the cost is too high for a given performance level, the solar collector will not become competitive with conventional fuels. Notwithstanding the fact that the future use of conventional fossil fuels is limited, with most recent estimates projecting an exhaustion of known reserves of oil and natural gas within this century, a solar collector having high system performance and relatively low cost must be produced before such systems will become viable alternatives to diminishing conventional fuel supplies. In addition, since nuclear energy sources and coal reserves exist in sufficient quantities to provide the necessary space heating energy requirements for the foreseeable future, a solar collector must at least compete with these types of fuels, even if projected cost per BTU of these fuels doubles or even triples in the future. For a solar system to be competitive, cost must be sufficiently reduced to provide incentive for its use.

In addition to the foregoing, it is necessary that the amount and cost of materials required for the construction of an efficient solar collector be reduced to a minimum, since relatively large areas of collector surface are necessary to capture the heat sufficient to condition the spaces contemplated. For example, the classical double pane-flat plate collector requires in the order of 3–5 pounds of glass, 2 pounds of copper or other absorber material and about 2–3 pounds of insulation, framing, and encapsulation materials, plus sealants, for each square foot of absorber surface. Consequently if solar collective devices are to become a variable alternative, the material requirements must be substantially reduced, not only because the cost effectiveness will increase, but also because, in the long view, strategic and energy intensive materials such as copper and aluminum should be conserved.

The discussion herein is in terms of cost and performance of the collector based upon square footage of absorber area. In certain cases the total collector structure cost per square foot (insulation, absorber, plumbing, and glazing), is high relative to effective absorber area. In the latter case the structure area is the basis for cost or performance calculations. If, as contemplated in the present invention, the major portion of the collector structure is a functional equivalent to absorber area, the former basis is a valid criteria.

It is important to realize that every area exerts different constraints on the solar system performance requirements. Total sunlight, average ambient atmosphere (e.g., degree days), percent of heating requirements offset by the solar system, and the length of the heating and cooling seasons, are basic parameters for calculating such variables as total collector surface necessary and the type and volume of storage required, which is compatible therewith. Further, each dwelling or structure requires individualized attention to particular constraints, e.g. the number of windows, exposure, type and quality of insulation, style of the dwelling, etc. In this connection, it is important to note that, as the collector structure becomes more complex the manufacturing and materials cost become more difficult to reduce.

The solar collector of the present invention is designed to obviate many of the disadvantages and limitations of the described prior arrangements by providing increased efficiency in performance and minimized cost in fabrication, combined with high speed production rates.

SUMMARY OF THE INVENTION

There has been provided a solar collector structure comprising a plurality of at least partially evacuated tubular members substantially transparent to incident solar radiation, said tubular members being arranged in a group and closely packed in parallel axial alignment, and means for joining the tubular members next to each adjacent tubular member of the group to form a tube sheet in a self-supporting structure. One tube sheet is arranged to lie in tandem with another, in a back-to-back configuration, one tube sheet acting as an insulated solar window, the other as a backing insulation. In a preferred embodiment, means is provided for joining together a pair of opposite margins of the tube sheets so as to provide at least one channel therebetween, and an absorber is disposed between the tube sheets in the channel for intercepting and absorbing solar radiation impinging thereon.

In certain drawings namely FIGS. 2, 3, 5, 6, 9 and 11 section lines for tube walls are omitted for clarity.

DESCRIPTION OF THE PREFERRED EMBODIMENTS

Figure 1:
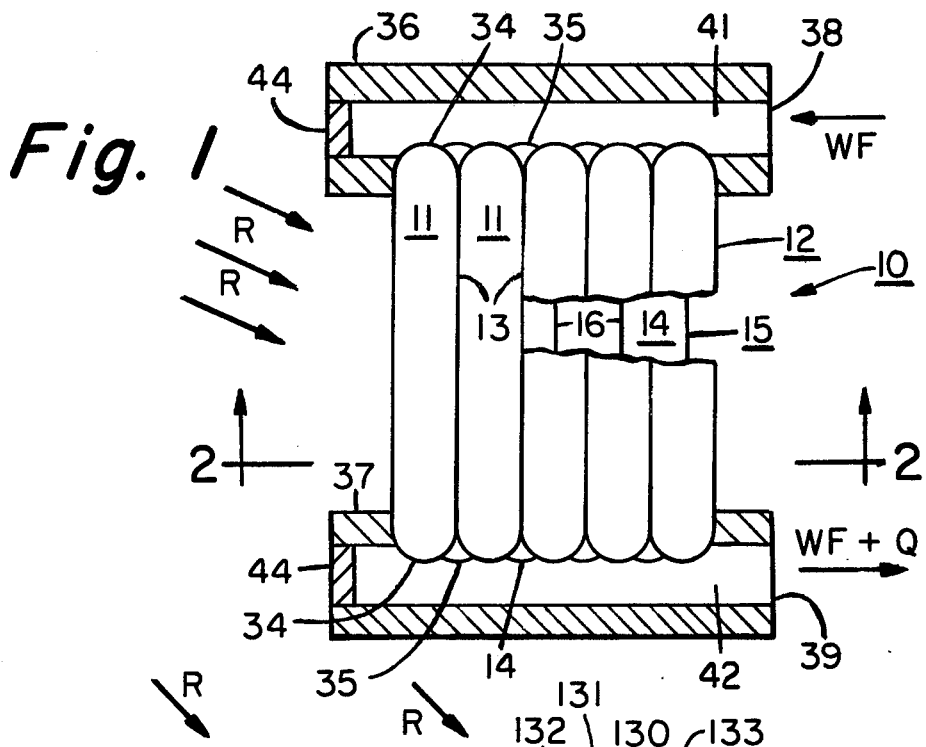
FIG. 1 is a frontal plan view of a solar collector constructed in accordance with the principles of the present invention, partially fragmented to illustrate the tandem arrangement of tube sheets.
Figure 2:
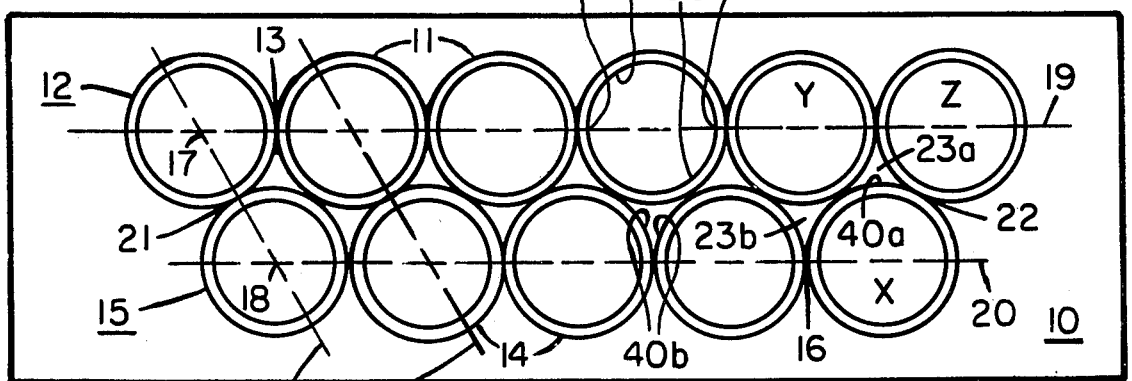
FIG. 2 is a view along line 2—2 of FIG. 1.

In FIGS. 1 and 2 there is illustrated a solar collector 10, wherein a first plurality, or group, of tubular members 11 are arranged in parallel axial alignment and formed into a tube sheet 12. Each of the tubular members or tubes 11 is attached by some appropriate sealing means to its adjacent tube along connecting seams or junctures 13. Sealing could be accomplished by employing a flexible silicone sealer such as silastic, in a bead along seam 13, a metal foil reacting with glass or a glass frit. Fusion bonding could be accomplished as the tubes are drawn. The tube sheets 12 and 15 could be drawn from a glass furnace forehearth having an outlet die with a proper profile. Hemi-cylindrical tubular members could be drawn in a sheet, and two of such sheets could form a tube sheet, Hemi-cylindrical sheets could be formed with a flat back sheet for closing the tubular hemi-cylinders, two of such structures in tandem would form an effective collector structure. While in the preferred embodiment the tube sheets are glass structures, plastic structures could be formed by similar methods.

Each of the tubes 11 may be partially evacuated to a partial pressure equal to that associated with the sealing temperature of a tube as it leaves a furnace or to some selected appropriate lesser temperature. For example, assume that a hot drawn glass tube will have an internal partial pressure of one atmosphere at a drawing temperature of about 1100° C. for a particular type of glass. If the tube is sealed shortly after drawing at an appropriate temperature and viscosity, as the tube cools the atmospheric pressure within the tube will reduce to approximately one half atmosphere or about 350 Torr. The tubes could be formed into sheets and thereafter heated to a selected temperature and closed while still at a relatively high temperature. On the other hand if it is desired to have high quality vacuum within the tube in the order of $10^{-6}$ Torr, each tube 11 may be pumped down to the vacuum required. It should be understood that, the higher the quality of vacuum within the tubes 11, the better insulating quality of the tube, since a greatly reduced atmosphere will reduce the possibility of convection and conductive heat transfer from the tubes, wherein a portion of collected energy is lost to the ambient via exposed surfaces.

A second row of tubular members or tubes 14 are arranged in a group to form a second tube sheet 15. The tubes 14 may be produced in the same way as tubes 11 mentioned above. Each of the tubes 14 has a vacuum of some selected partial pressure and each are sealed or bonded to an adjacent tube along connecting seams or junctures 16 to provide a self-supporting tube sheet structure 15. The tube sheets 12 and 15 are positioned in a stacked or tandem arrangement as illustrated. In the preferred embodiment, longitudinal axes 17 and 18 of each respective tube 11 and 14 are aligned in parallel to form the tube sheets 12 and 15 in a planar arrangement. For example in a preferred embodiment, the parallel axes 17 of the tubes 11 forming tube sheet 12 lie in a common plane 19, such that plane 19 passes centrally through tube sheet 12. Plane 19 is parallel to a plane 20 passing centrally through tube sheet 15 and including parallel axes 18 of tubes 14. If it were desired that the alignment of the tube sheets 12 and 15 should be arcuate, staggard, spaced apart or skew, such an arrangement would be possible.

The tube sheets 12 and 15 are sealed or bonded to each other longitudinally at respective opposite lateral margins along outer seams or junctures 12 and 22, forming respective upper and lower flow channels 23a -23b therebetween which are hereinafter referred to generally as flow channels unless their relative position is important for the explanation. Interstices between tube sheets 12 and 15 forming flow channels 23a–23b and allow the passage of a working fluid therebetween. If the planes 19 and 20 for each of the tube sheets are separated somewhat so that none of the tubes in the adjacent tube sheets 12 and 15 touch each other, the flow channels 23a–23b disappear and a single flow channel extending the width of the tube sheets is created. Some appropriate joining means at respective lateral ends along the outer seams or junctures 12 and 22 of each of the tube sheets would laterally define and close the flow channels so formed. It is possible to place the tube sheets 12 and 15 in tandem such that respective axes 17 and 18 of tubes 11 and 14 lie in planes 19 and 20 but are perpendicular in projection. Such an arrangement would present at least one corrugated surface within the tube transverse to the flow of working fluid which surface would cause beneficial turbulence. In a preferred embodiment illustrated however, the tubes are in close contact in a hexagonal packed arrangement as shown in FIG. 2.

Figure 3:
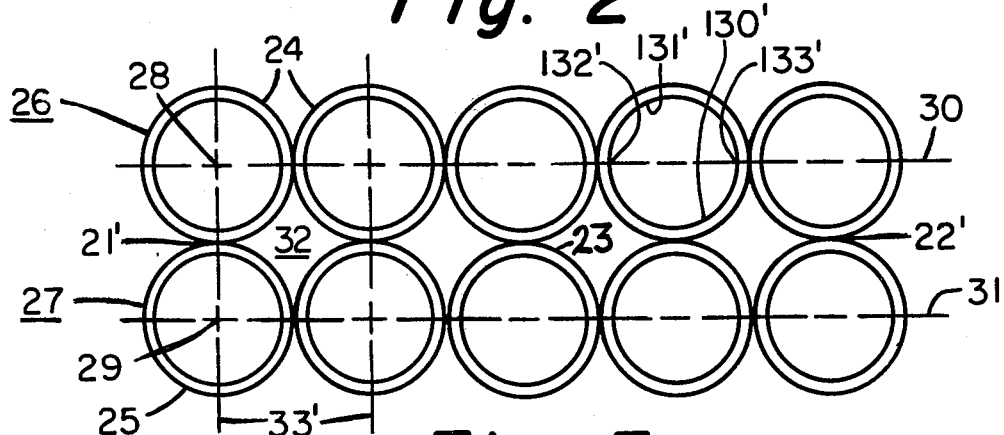
FIG. 3 is a plan view, in cross-section similar to FIG. 2, of an alternative embodiment of the solar collector of the present invention, illustrating an alternative packing arrangement.

FIG. 3 illustrates an alternative arrangement wherein only tube sheets 24–27 are illustrated in cross section. Tube sheets 26–27 are formed from groups of respective tubular members or tubes 24 and 25. In FIG. 3 tubes 24 and 25 are arranged so that respective axes 28 and 29 thereof lie in parallel alignment in planes 30 and 31. The arrangement is similar to that of FIG. 2, except that in the arrangement of FIG. 3, respective axes 28 and 29 of tubes 26 and 27 are in vertical alignment in planes 33' to form a cubic packed structure whereas in FIG. 2 the respective axes 17 and 18 of tubes 12 and 14 are in parallel but vertically offset lying in skew planes 33. Axes 17 of tubes 11 and axes 18 of tubes 14 lie alternately between the other. The different arrangement of tubes in FIGS. 2 and 3 provide for different geometrical dimensions of flow channels 23a, 23b and 32. The hexagonal packed arrangement, illustrated in FIG. 2, yields more channels for the number of tubes used than the cubic packed arrangement, illustrated in FIG. 3. However, the channels 32 of cubic packed arrangement are of greater cross section than the channels 23a–23b.

It should be mentioned that the arrangement of FIG. 2 is adaptable to a number of flow arrangements. Either, upper chambers 23a or lower channels 23b may be blocked to control fluid flow. With proper header arrangements fluid may be directed through upper channels 23a and thence through lower channels 23b, or vise versa, if desired. The structures of FIG. 2 and FIG. 3 are adaptable to both series or parallel flow arrangements for adjacent tubes. The differences in the arrangements of FIGS. 2 and 3 are to be evaluated for the particular application.

The arrangement of tubes discussed above exhibits a relatively strong, rigid, and light weight, self supporting structure, such that the materials requirements can be substantially reduced. Further, the lower tube sheets 15 can have an integral absorber surface which is referred to below. Tubes have the advantage of ease and speed of manufacture, such as by conventional tube draws or sheet draw with vacuum or air formation. The tubular structure eliminates the added requirements for additional equipment to provide flow channels, since interstices between the tubes form the flow channels by which working fluid is passed in heat exchange relation with the absorber surface.

Referring to FIGS. 1 and 2, respective opposite transverse free ends 34 and 35 of tube sheets 12 and 15 form a boundary for inlets and outlets for the flow channels 23a–23b. Headers 36 and 37 are arranged to mate with the opposite transverse free ends 34 and 35 of respective tube sheets 12 and 15 in order to place flow channels 23a–23b in communication with inlet and outlet through channels 41 and 42. A working fluid WF enters an inlet port 38 for header 36 and passes through inlet channel 41 through flow channels 23a–23b and thence through outlet channel 42 leaving via outlet 39 of header 37 as working fluid WF and useful solar heat Q.

Incident solar radiation illustrated by the arrows R impinges upon surfaces of the lower tube sheet 15. The surfaces which act as the solar absorber are illustrated by reference numerals 40a–40b, which correspond to those portions of the respective flow channels 23a–23b in which they lie. Solar energy R impinges on the surfaces 40a–40b and is converted to sensible heat Q, which is given up to working fluid WF in heat exchange relation with the absorber surfaces 40a–40b, as it passes through respective flow channels 23a–23b. Note that in FIG. 3, surface 23 of the lower tube sheet 27 may be coated with a suitable absorbent material.

The solar collector 10 of the present invention may be arranged in parallel or serial relationship with other collectors of the same configuration by the addition of, or removal of plugs 44 in the ends of the headers 36 and 37.

Figures 4A, 4B:
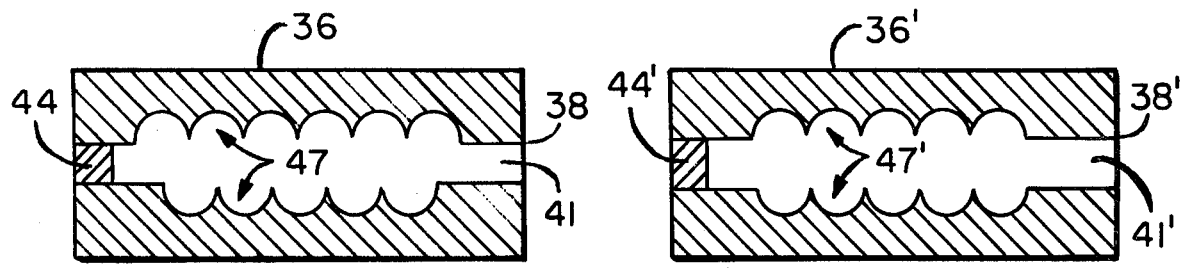
FIGS. 4A and 4B show alternative header profile arrangements in side sectional views.

FIG. 4A shows a cross sectional view of the header 36 of FIG. 1, wherein opening 47 is formed in the header with a profile corresponding with the exterior shape of the tube sheets 12 and 15, as they lie in tandem. Transverse channel 41 communicates with the opening 38 and flow channels 23a–23b. Removable plug 44 is available for multiple collector configurations. Header 37 is similar for the other transverse ends 34 and 35 of the tube sheets 12 and 15. FIG. 4B shows a header 36' which could be used for the tube arrangement of FIG. 3. The opening 47' corresponds to the profile of the tube arrangement of FIG. 3. Channel 41', plug 44' and opening 38' are functionally similar to corresponding portions of header 36. The headers may be formed by moulding, foaming in place or by machining a solid body of material.

Figure 5:
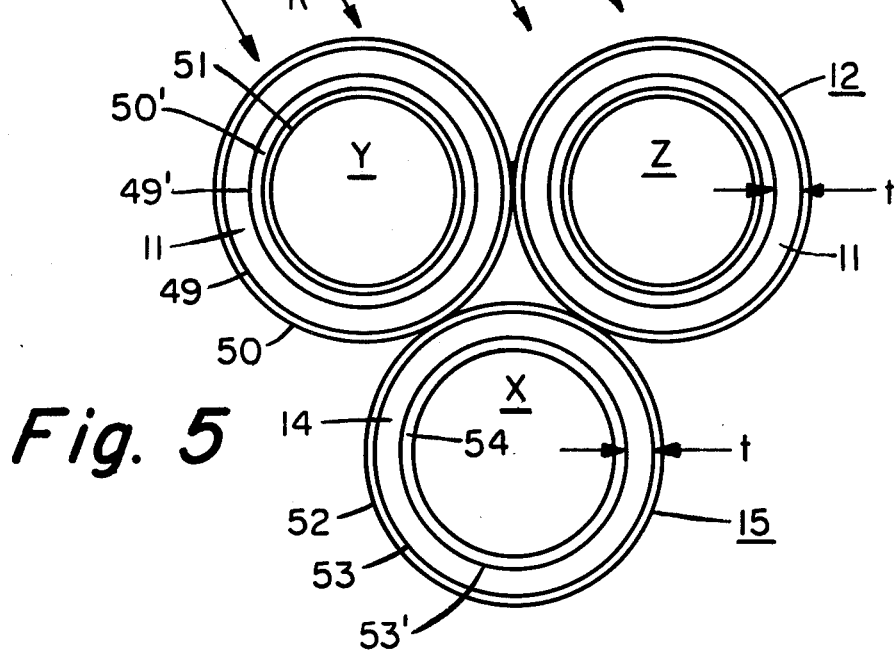
FIG. 5 is an enlarged view showing a portion of the tubes X, Y and Z of FIG. 2 in cross section and illustrating schematically various surface treatments for increasing the efficiency of the collector.

FIG. 5 shows a portion of the solar collector of the present invention wherein tubes X, Y and Z are illustrated in detail. In this particular arrangement a number of coatings or surface treatments are provided for the various surfaces of the tubes to illustrate some of the arrangements which assist and enhance the efficiency of the solar collector.

For example, on exterior surfaces 49 of tubes 11, an antireflecting surface treatment 50 may be provided. This surface may be established by the use of antireflecting coatings of a selected thickness and refractive index. On the other hand surface 50 may be established by treatment of surface 49 by phase separation of the glass and leaching techniques, which erode a portion of the surface 49 and provide microscopic surface abrasions which permit the surface 49 to act as an antireflecting surface 50. Such a technique is illustrated and explained in U.S. Pat. No. 4,019,884, Elmer et al. issued Apr. 26, 1977, assigned to Corning Glass Works. In addition to the external antireflecting surface 50, interior surface 49' of tube 11 at 50' may also be treated in a similar manner so that each ray of solar radiation R entering tubes 11 will encounter a gradual refractive index transition from one medium to the other at each surface boundary, and thereby suffer less reflective losses, enhancing the efficiency of the collector.

Other optical treatments of the surfaces may also be used. For example, in addition to or instead of surface treatment 50', the interior surface 49' of the tubes 11 may be coated with an infra-red reflective film or filter 51, having a high reflection in the infra-red range of wave lengths greater than about 2 microns, but high visible-range transmission characteristics. Such a film 51 blocks a certain portion of the incident radiation R entering the collector 10, but enhances the efficiency of the collector by reducing re-radiation of energy emitted from the absorber through the tube sheet 12 in the infra-red range noted above.

A black absorber coating 52 is disposed on surface 53 of the lower tubes 14 of tube sheet 15. In one form, the black absorber coating 52 may be a black body absorber, e.g., black paint having high $\alpha$ and $\epsilon$. On the other hand, the black absorber coating 52 may be a selective coating, which has high absorptivity $\alpha$ characteristics in the visible radiation range of the solar energy spectrum, and has low infrared emissivity $\epsilon$ characteristics, so that visible energy impinging thereon will be absorbed by the black absorber and re-radiation in the infra-red region will be kept to a minimum. Such a selective coating may be black chrome on copper or tin oxide which exhibits high absorptivity $\alpha$ in the order of 0.95 and low emissivity $\epsilon$, in the order of 0.15. Since it is presently impossible to reduce the emissivity $\epsilon$ of any black absorber to zero, the infrared filter 51 mentioned above reflects the infrared radiation emitted from the black absorber back onto the absorber coating 52, as if the infrared filter 51 were a mirror which is effective only in the infrared range. In this way radiation which tends to escape from the black absorber coating 52 will be re-reflected onto the absorber so that efficiency of the collector will be increased.

In order to prevent radiation through the back of the collector 10 via tube sheet 15, an infra-red filter or mirrorized surface 54 may be provided on the interior surface 53' of tubes 14. In this way radiation which might tend to escape from the back of collector 10 (downwardly in FIG. 5) is trapped within the flow channel, 23a, 23b and reflected towards the absorber surface 52.

In the present invention, the thickness of the black absorber coating 52, in the order of several $\mu$m, provides a very high circumferential resistivity to thermal conduction along the absorber coating 52 and permits negligible thermal losses.

A more important source of circumferential thermal losses occurs by conduction of thermal energy along the walls of each of the tubes 11-14. Such losses may be substantially reduced by producing thin walled glass tubes. In one embodiment for example the tube thickness $t$ is about 0.060 inch which offers reasonably low thermal resistance to circumferential conduction of thermal energy. It is contemplated however that a glass tube of appropriate strength with a thickness $t$ of about 0.020 inch may be used. A thinner tube of thickness $t$ of about 0.015 inch manufactured from a laminate glass would reduce circumferential thermal conductive losses even further while still maintaining sufficient strength. Thin walled tubes could be suitably heat or chemically treated and fabricated into an impact and thermal shock resistant glass envelope. It should be appreciated that as the tube thickness $t$ decreases the thermal resistance of the tube wall increases, and therefore thermal losses decrease. The tube thickness $t$ as well as the various coating arrangements are greatly exaggerated and not depicted in accurate scale in the drawings. The purpose of such exaggeration is to assist in the explanation of the invention.

The apparatus of the present invention has the great advantage that, in the preferred embodiments, the structure is formed almost entirely of glass. It has been shown that such material can be produced in great quantities at very low cost. An example of such high production, low cost tubing is that of the typical fluorescent light bulb tubing, which may be adapted for use in the solar collector of the present invention. In the present invention clear glass tubing formed by processes similar to that used for the formation of fluorescent tubes can be the basis of highly efficient low cost solar collectors. It should be further pointed out that, in the particular configuration of the present invention, few constituents other than glass are used, except that which might be used in the coating materials including oxides or compounds made from metal, and the headers. The material necessary to produce the apparatus of the present invention is essentially glass with small amounts of other materials.

The headers 36–37 necessary for providing conduits into and out of the channels, such as 23a–23b between the tube sheets 12–14, may be formed from various types of insulating material. In the preferred embodiment material such as polyurethane or ureaformaldehyde foam may be used. A glass insulation suitably formed from particles and/or fibers with binders might also be utilized. The headers 36–37 may be fashioned withe openings formed by suitable casting, foaming in place, or "machining" methods. The use of such foams is desirable since they are light weight, inexpensive and their fabrication and set-up time is quite short. Further, the materials exhibit a high insulating rating (k value), which is desirable. It should be understood that other header arrangements are possible and could be adapted for use with the tube sheet arrangements of the present invention.

Figure 6:
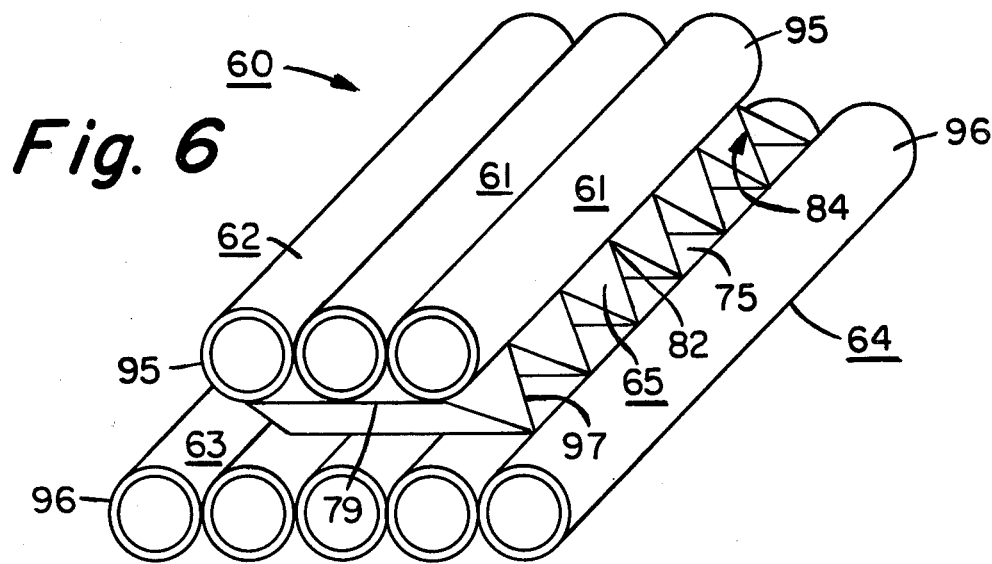
FIG. 6 is a schematic diagram showing a portion of another embodiment of the solar collector of the present invention.

In another embodiment of the present invention in FIG. 6 a collector 60 is illustrated which is similar to the collector 10 except that the tube sheets are spaced apart and an absorber material is disposed therebetween. In FIG. 6, a portion of the collector 60 is shown wherein tubular members or tubes 61 lying adjacent one another in a configuration similar to that shown in FIG. 1, form tube sheet 62. Likewise tubular members or tubes 63 adjacent each other form a second or lower tube sheet 64. An absorber surface 65 is disposed between the tube sheets 62–64 which absorber surface may be copper or aluminum foil material or other appropriate material. The surface 65 is corrugated as shown and may be waffled, pierced or flat if desired. The use of a corrugated absorber is beneficial for the reasons to be discussed below in connection with the general description of the structure.

Figure 7:
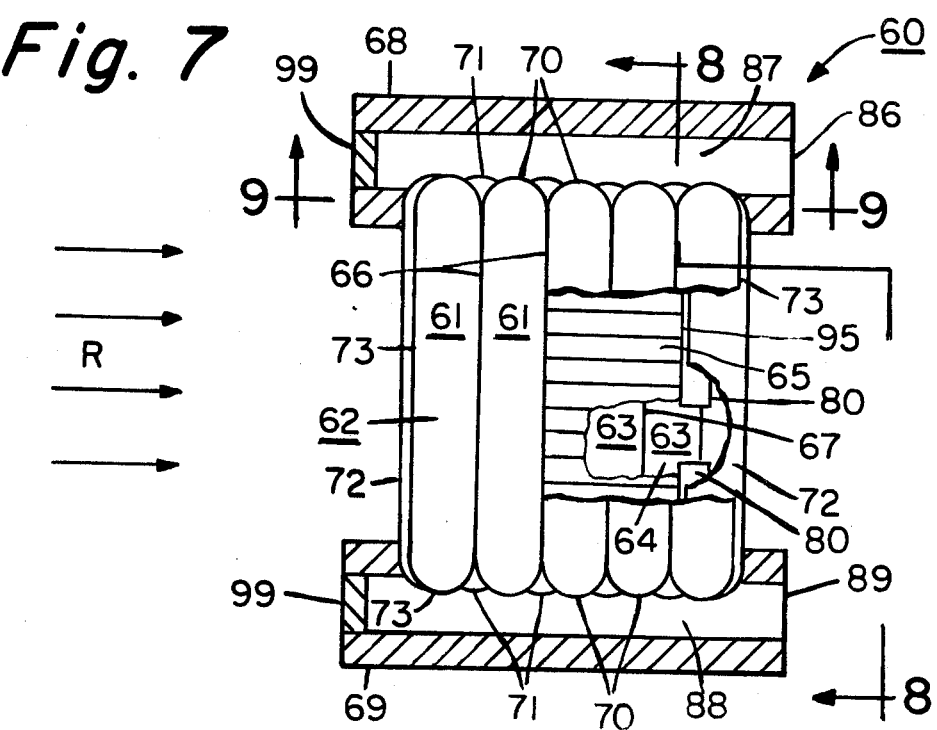
FIG. 7 is a partially fragmented frontal plan view of a solar collector constructed in accordance with the principles of the present invention, described with respect to FIG. 6, but in greater detail.
Figure 8:
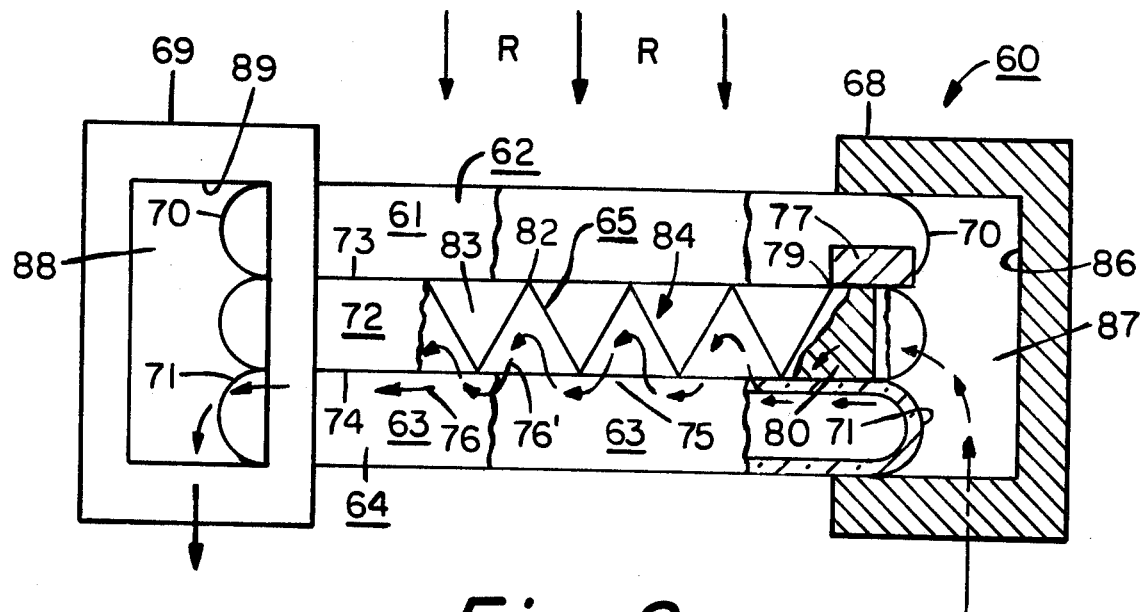
FIG. 8 is a side elevation of the collector illustrated in FIG. 7 partially fragmented and sectioned at one end, and viewed along line 8—8 of FIG. 7.

In FIGS. 7-8 the collector 60 is illustrated in greater detail. Tubes 61 lie adjacent one another and are joined along junctures or seams 66 to form the tube sheet 62. Likewise tubes 63 are joined along adjacent junctures or seams 67 to form tube sheet 64.

Figure 9:
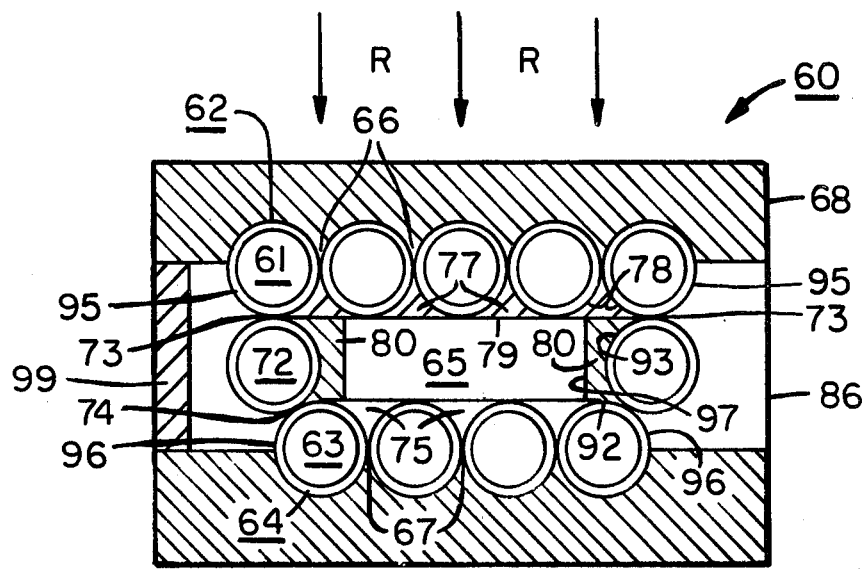
FIG. 9 is a side sectional elevation of the collector sectioned along lines 9—9 of FIG. 7.

Opposite headers 68 and 69 engage with respective opposite free transverse ends 70 and 71 of tube sheets 62 and 64. Transition tubes 72 are aligned and engaged with respective opposite free lateral ends 95 and 96 of the tube sheets 62 and 64. A flow channel 75 shown more clearly in FIGS. 8 and 9 is laterally defined and closed when the transition tubes 72 are sealed to the respective free ends of 95-96 of tube sheets 62-64 along seams or junctures 73-74.

Flow channels 75, in the embodiment shown, extend from one header 68 to the other opposite header 69 below the absorber surface 65 (see arrows 76-76'), which represent the flow paths for working fluid WF.

The flow channel 75 extends only below the absorber surface 65 by choice, due to the insertion of blocking plugs 77 disposed in the upper portion of the collctor 60, in intersticies between lower portion 78 of tube sheet 62 and upper margin 79 of absorber 65. FIG. 8 illustrates that the length of plugs 77 need only extend so far as to engage with upper margin 79 of the absorber 65 so that working fluid WF is deflected below the absorber surface. Another set of plugs 80 are disposed in intersticies between lateral margin 97 of absorber 65, upper margin 92 of lower tube sheet 64, and inward margins 93 of the transition tubes 72. Plugs 80 substantially block the flow of working fluid WF along lateral margins 95 of the absorber 65 and may if desired extend from header 68 to 79.

Solar radiation directed at the collector 60 passes through tube sheet 62 and impinges on the absorber surface 65. The radiation R is absorbed and given off to the working fluid WF which is passed through flow channel 75. The corrugated shape of the absorber 65 causes turbulence and permits the working fluid WF to agitate the flow in the area below peaks 82 of the absorber (see arrows 76-76'). The turbulence caused by the corrugations in the absorber 65 enhances the heat transfer characteristic between the absorber surface and the working fluid. Since the plugs 77 and 80 respectively block the flow of working fluid WF over and to the sides of the absorber 65, air or fluid becomes trapped in the intersticies 83 between surface 84 of the absorber and lower portion 78 of tube sheet 62. The interstices 83 are small relative to the rather dense corrugation of the absorber surface 65 and thereby circulation of fluid above the absorber 65 is inhibited. The inhibition of circulation reduces convection losses to the upper tube sheet 62 and therefore enhances the collector effectiveness.

Figure 10:
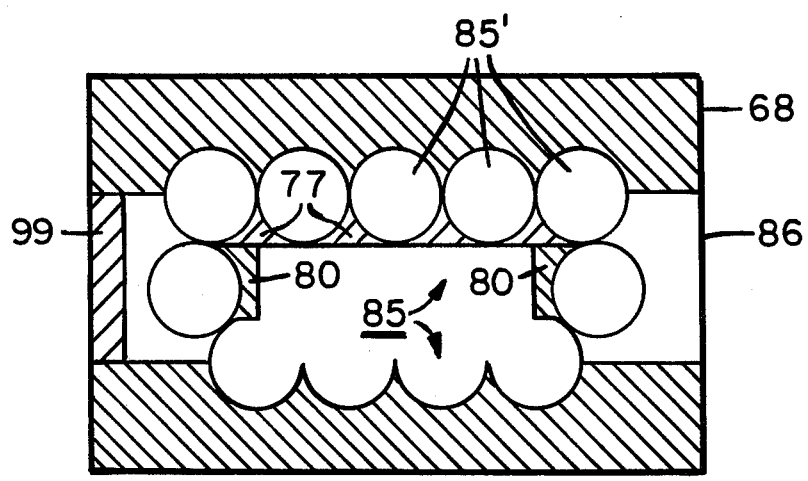
FIG. 10 is a schematic header profile for the collector of FIG. 7.

A cross section profile of one of the headers 68, absent tubes, is illustrated in FIG. 10. The header 68 has a main opening 85 and tube openings 85'. The header 68 has a profile corresponding to the positioning of the respective tubes 61, 63, and 72. Note plugs 77 and side plugs 80.

FIGS. 7-8 illustrates the working flid WF flow paths for the collector 60. Working fluid enters the collector 60 via inlet 86 and channel 87 of header 68. Flow continues through flow channel 75, between tube sheet 64 and absorber surface 65, where the working fluid WF picks up useful solar heat Q, thence through channel 88 and outlet 89 of header 69, as WF + Q.

Plugs 99 may be used as plugs 44 and 44' of FIGS. 4a and 4b adapting the collector 60 for use in series or parallel arrangement with other collectors as previously mentioned.

The transition tubes 72 are useful as a means of closing and defining flow channel 75, between tube sheets 62-64 along respective junctures or seams 73 and 74 of opposed respective free ends 96 and 97 of the respective tube sheets. The transition tubes 72 also maintain the space between the tube sheets 62 and 64 uniform, while adding rigidity to the collector 60 with a structural glass member. The transition tubes 72 may be optically treated for the reasons set forth above relative to the aforementioned tube sheet arrangements.

The tubes 61, 63, and 72 are at least partially evacuated in accordance with the principles discussed above with respect to the collector 10.

An upper surface 84 of absorber surface 65 has, in the preferred embodiment, a selective absorber coating deposited thereon. As previously noted selective absorber coatings enhance the collector efficiency and prevent substantial reemission of incident radiation from the absorber surface 65. Further it should be realized that the optical treatments for the tubes, discussed above, may also be utilized to enhance the efficiency of the collector 60.

Variations of the flat plate may be envisioned by the substitution of a black metallic or glass wool for the absorber, which wool may be inserted within the flow channel 75 or within the other channels mentioned above for the other embodiments discussed. The black wool acts as an absorber with high effective surface area and assists in the turbulation of the fluid passing through the channels. Another alternative might be to substitute a black fluid for absorber surfaces, such as water, oil or other appropriate liquid carrying fine carbon-black particles or suspended pigments which directly absorb the heat into the fluid as it passes through the channels.

It should be understood that if different absorbers and liquid working fluids are used, the materials and configuration of the headers might be modified in order to optimize the design. In addition, if plastics are used for the headers, they should be covered with some protective weather resistance coating, in order to prevent degradation of plastic material by moisture or the ultraviolet band of the impinging solar radiation. Similarly if a glass foam is used it is necessary to protect the structure from excess moisture. This precaution enhances the life expectancy of the unit, and various changes and modifications can be envisioned accordingly.

In yet another embodiment of the present invention there is provided a first tube sheet 12 as illustrated in FIG. 1 which is essentially transparent to solar radiation and a second tube sheet 15 which is opaque to solar radiation. In the embodiment contemplated, lateral free ends of the tube sheets 12 and 15 are joined at seams 21 and 22 forming channels 23a-23b. The lower tubes 14, in the embodiment referred to here, might be manufactured preferably from a black glass composition. In this way the glass tubes 14 act as the absorber surface communicating with channels 23a-23b. Coatings such as antireflecting films or surface treatments discussed with reference to FIG. 5 may be used as well, to enhance solar collection efficiency. The absorber surface in such embodiments, however, is the glass surface 53. The use of black glass would dispense with the need for a separate absorber surface, e.g. 65, in FIG. 7, or black coating 52 in FIG. 5. If some transparent glass tubes were used for the lower tube sheet 15, the collector could be utilized as a window or skylight. That portion of solar radiation passing through the clear tubes will provide illumination and heat for the interior of a building structure.

As mentioned previously, gaseous or liquid working fluid may be used as a heat transfer medium. In the case of liquids it may be desirable to move the absorber surface from the location on the lower tube sheet (see surfaces 40a and 40b in FIG. 2 and surface 23 in FIG. 3) to interior surfaces 130 and 130' of the tube sheet 12 and 26 of respective FIGS. 2 and 3. The absorber material would be deposited on the lower half of the respective inner surfaces 130-130' of tubes 11 and 24 between points 132-133 and 132'-133'. This arrangement would protect the absorber from liquid flowing in the respective flow channels 23a-23b and 32. Further, the upper half of the tubes 11 and 24 could be coated on the respective surfaces 131-131' with an optical treatment such as described with respect to FIG. 5. An infrared reflective film deposited on the surfaces 131-131' of the respective tubes 11 and 24 would reduce reradiation of energy from the absorber coating deposited on the lower half of the aforementioned tube surfaces 130 and 130'. It should be emphasized further that the absorber coating chosen may be of the kind which exhibits good absorptivity α and emissivity ε characteristics so as to further reduce the radiation losses to ambience. Thin walled tubes are important to reduce circumferential losses to atmosphere as noted above but also to assist in the heat transfer radially to the fluid in the flow channel described above. The aforementioned coatings could be deposited on operative external surfaces of the tubes of the upper tube sheet if desired provided the working fluid or ambience does not degrade the materials used.

The aforementioned advantages and various possible configurations of the present invention rely to a great extent on the simplified construction techniques made possible by the arrangement of tube sheets as component modules for solar collectors. The advantage of tube sheet arrangements is not simply limited to construction features however. The tube sheet arrangement tends to enhance the collector's optical properties in a way that the classical flat plate arrangements do not. As will be explained below there are decided optical advantages to the tube sheet arrangement even though it might not be so readily apparent.

It is important to note that the collection of solar radiation is not degraded by the tube sheet arrangement of the present invention, notwithstanding the tubular profile presented to the incident radiation. The tube sheet exhibits what is called a mutual scattering effect and produces a highly effective window for the efficient transmission of solar radiation therethrough.

Figure 11:
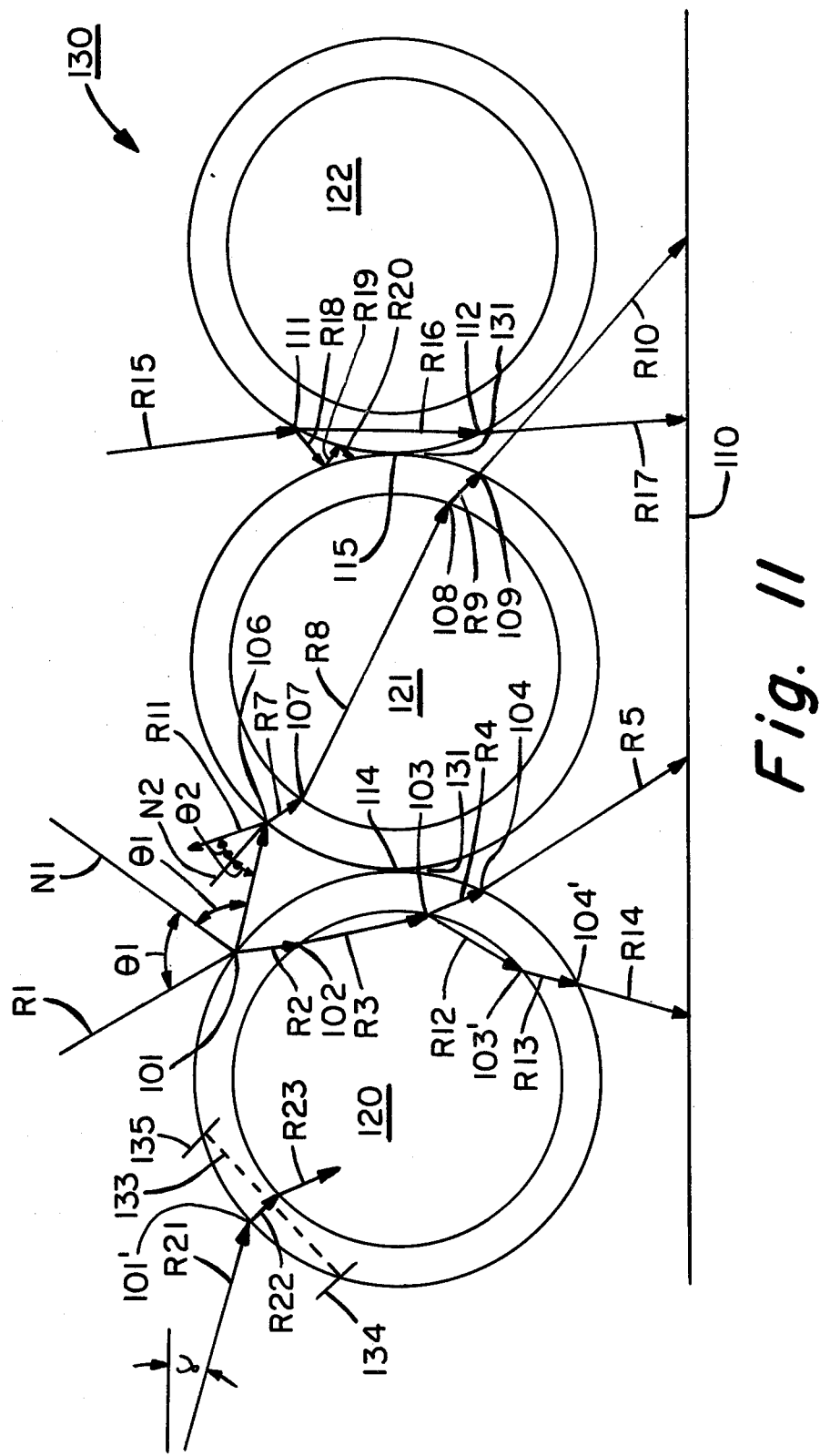
FIG. 11 is a schematic representation of mutual scattering of radiation between adjacent tubular members of the collector window.

The closely spaced tubes 120-122 in FIG. 11 illustrate schematically a portion of a collector 130 constructed in accordance with the principles of the present invention. The ray diagram, explained blow, shows, by way of example, the collector 130 acting as a light trap of sorts. R1, an incident ray impinging on the outer surface 101 of the tube 120 at an angle 1 with respect to normal N1 is partially refracted and reflected. The refracted portion passes through the tube wall 120 as R2 and enters the interior of tube 120 at 102 as R3. Thereafter the ray R3 encounters the tube 120 wall at 103, a portion thereof passes therethrough as refracted ray R4, leaves the tube 120 at 104 as ray R5 and thereafter encounters the absorber surface 110. It should be noted that at each boundary encountered rays are both refracted and reflected, thus the reason for labeling the rays differently after each boundary encounter.

A ray R6 is a reflected portion of ray R1 from surface point 101 of tube 120, scattering away from point 101 at an angle 1 relative to the normal N1. The ray R6 impinges on outer surface point 106 of adjacent tube 121 at an angle 2 relative to normal N2. The fraction of ray R6, refracted as ray R7 at 106, passes through the wall of tube 121, enters the interior of tube 121 at 107 as R8 and passes therethrough. Thereafter the ray R8 encounters the wall of tube 121, a portion thereof enters at 108 as refracted ray R9 and leaves the tube 121 at 109 as ray R10, to encounter the absorber surface 110. Note that, a portion of ray R6, reflected away from the surface point 106 of tube 121 as R11 is lost to the ambience. However, depending on the angle of γ, a certain portion of the original ray R1 reaches the absorber 110 as rays R5 and R10. The effect known as mutual scattering occurs over the entire collector 130 and permits recapture of a portion of incident radiation which might otherwise be reflected away from surface of a flat window. The curvature of the outer surfaces of the tubular members 120-122 has the effect of increasing the collection of reflected radiation from the surface of the collector 130. Rather than exhibiting the deleterious effects the tube sheet design of the present invention captures certain reflected rays which otherwise might be lost to the ambience.

Many scattering events occur over the surface of the tube sheet arrangement of the present invention, due to both direct and diffuse impinging radiation. The tube sheet arrangement is responsible for simple and complex multiple scattering. For example multiple boundarys, i.e. interior and exterior surfaces of the tubes, normally require the radiation to pass through two curved surfaces of the tubes (see rays R1-R5). There is an exception at fringe areas near seams 131, note rays R15, R16, R17, wherein a portion of ray R15 enters tube 122 at 111, passes through the wall as R16, exits at 112 and encounters absorber as R17. There is only one excursion through a tube wall for the ray R16. The more encounters between media (e.g. air, vacuum, glass, working fluid sealants) the more reflections and refractions. Furthermore encounters near seams 131 are complicated by tube to tube contact of immediately adjacent tubes. See for example tangent points 114 and 115 for respective adjacent tubes 120, 121 and 121, 122 along the seams 131. Radiation encountering tube surfaces in this area experience drastic scattering akin to a light trap. Note for example rays R18, R19, R20. Ray R18 is the reflected portion of ray R15 impinging on tube 122 at point 111. Rays R19 and R20 are respectively reflected portions of previous rays in the series R18-R19. The zig zag pattern shown for rays R15, R18-R20 is typical for rays encountering the tube sheet in the vicinity of the seams 131. It should be realized that each ray trapped in this fashion is a relatively large portion of the previous ray and that the trapping effect due to scattering picks up a greater proportion of the initial incident radiation than a flat surface. In other words, if the solar window presented to incident radiation is flat all reflected initial incident radiation will be lost to ambience. Whereas in the present invention at least a portion of reflected incident radiation is recaptured, thereby rendering the collection more effective.

As previously mentioned above, each ray is reflected and refracted, and that for each encounter with an interface, a portion of each ray is reflected, according to known principles, at an angle equal to the angle of incidence. With a few exceptions, suitably noted, a greater proportion of each incident ray shown in FIG. 11 reaches the absorber surface by the refraction and reflection mechanism. Note for example the path of rays R12, R13 and R14. The ray R12 is a reflected portion of ray R3 as it encounters the interior surface of tube 120 at 103. The ray R12 is reflected towards another portion of the interior surface of tube 120 at 103′ and thereafter a portion thereof enters the tube wall 120 as R13 and exits at 104′ as ray R14 which encounters the absorber surface 110.

Of the possible encounters, too numerous to detail, the ones illustrated above are exemplary of the mutual scattering mechanism. To show in the examples described above each reflected ray for each interface transition of a ray would unduly complicate the drawing. It has been found that while some incident radiation is lost, by reflection and total internal refraction, the net effect has been an increase in absorbed radiation on the collector surface.

It should be realized that the reflection and refraction of rays making various encounters with differing media (air, glass, vacuum, etc.) may be more or less drastic depending on the particular quality of the media encountered at a particular interface including surface treatments. Other variations of the geometry discussed herein may be more or less effective, depending on the materials and parameters.

The arrangement of the tube sheet acting as an energy trap may be extended to the absorber surface 65 shown in FIG. 6 where multiple reflections tend to redirect radiated emissions of impinging incident solar energy. The tubular arrangements of the respective tube sheets 15-27 in FIGS. 2 and 3 acts as a trap in a similar manner as above explained in the vicinity of points of contact between the tubes 14 and 25 of the respective structures near seams 16 and 16′.

Another advantage of the tubular arrangement of the present invention is that for low angles of incident radiation there is a receptive surface for receiving radiation. Note for example ray R21 approaching the tube 120 at an angle $\gamma$ with respect to the horizontal. If $\gamma$ is small i.e. below a given critical angle for a flat surface of specific composition the ray R21 encounters the surface point 101′ of tube 120 such that it is at least partially refracted as ray R22. The same ray R21 would be totally reflected from a flat plate. Therefore even at low angles of incident radiation there is some minimum window available to receive solar radiation which is not available for a classical flat plate collector. Such an arrangement effectively increases the solar day thereby permitting greater energy collection potential.

The line 133 bounded by end points 134, 135 may be imagined as a projection of a window in cross section, which follows the sun from left to right during the course of the day. For small angles of incidence $\gamma$ the window 133 faces the sun at a more advantageous angle than a flat plate which would be oriented in the horizontal in FIG. 11. As the angle of incidence $\gamma$ increases the effective window area measured by cos $\gamma$ increases to a maximum at 90. This occurs for both classical flat plate collectors and those of the type described herein. However since the solar day is effectively increased by the tubular arrangement of the collector of the present invention, for small angles of $\gamma$, the collector effectiveness is increased. Further since the tubes act as a radiation trap the maximum collectable energy increases, thereby enhancing solar collector performance.

While there has been described what are considered to be preferred embodiments of the present invention, it will be readily apparent to those skilled in the art, that various changes and modifications may be made therein without departing from the invention, and is intended, in the appended claims, to cover all such changes and modifications, as fall within the true spirit and scope of the invention.

I claim:

1. A solar energy collector structure comprising:
   a plurality of partially evacuated tubular members substantially transparent to incident solar radiation, said tubular members having opposed lateral ends being arranged in a first group and lying adjacent one another in parallel axial alignment, means for joining each tubular member next to each adjacent tubular member of the group to form a self supporting tube sheet structure;
   a second group of partially evacuated tubular members having opposed lateral ends joined as said first group to form a second tube sheet structure, said first and second tube sheets arranged adjacent each other in tandem to form at least one flow channel therebetween, means joining the lateral free ends of each tube sheet to an adjacent lateral free end of the other, for providing closure for and defining limits to the flow channel formed between said tube sheets, and
   an absorber surface disposed in communication with said flow channel for intercepting and absorbing solar energy.

2. The solar energy collector of claim 1 further including: header means engaging with opposite free transverse ends of the tube sheets for providing inlet and outlet passages in communication with said flow channel.

3. The solar energy collector of claim 1 wherein said absorber surface comprises an absorbtive film deposited on a selected operative surface of at least one of said first and second tube sheets.

4. The solar energy collector of claim 1, wherein said absorber surface comprises: an absorbtive metallic foil disposed between said tube sheets.

5. The solar collector of claim 4 including: plug means for blocking a portion of said flow channel between the first tube sheet and the absorber such that an insulating space is formed therebetween.

6. The solar collector of claim 1, wherein said first tube sheet includes: antireflective optical surfaces for providing enhanced transmission of solar radiation through said tubular members towards said absorber surface.

7. The solar collector of claim 6, wherein said first tube sheet further includes: limited energy bandwidth reflective surfaces for rendering the first tube sheet substantially opaque to energy in a portion of energy wave lengths corresponding to the infra-red radiation of wavelength greater than about 2 microns and substantially transparent to energy wave lengths of shorter than the above mentioned radiation, such that energy greater than the aforementioned infra-red wavelength within the collector is prevented from re-radiating through the first tube sheet out of the interior of the collector.

8. The solar collector of claim 6, wherein said second tube sheet includes: a reflective surface behind said absorber means for blocking radiation of energy from said absorber means in a direction out of the interior of the collector.

9. The solar collector of claim 8, wherein said reflective surface comprises an optical treatment for rendering the second tube sheet substantially opaque to infra-red radiation of greater than about 2 microns.

10. The solar collector of claim 8, wherein said reflective surface is a highly reflective mirrorized interior surface for each of said tubular members in the second tube sheet.

11. The solar collector of claim 1, wherein said collector is adapted to receive a working fluid into and out of said channel in heat exchange relation with said absorber surface.

12. The solar collector of claim 1, wherein said tube sheets are arranged in intimate contact and intersticies between the adjacent tubular members form flow channels.

13. The solar collector of claim 1, wherein a portion of said radiation is reflected upon encountering various surfaces of said tube sheet structure, said tubular members of said tube sheet being arranged in relatively closely spaced alignment such that major portions of said reflected radiation becomes further reflected by mutual scattering and is trapped within said collector.

14. The solar collector of claim 1, wherein said tube sheets are arranged in intimate contact and wherein the central axes of the tubes of one tube sheet are laterally off-set from the central axes of the tubes of the other tube sheet.

15. The solar collector of claim 1, wherein said tube sheets are arranged in intimate contact in cubic packed arrangement.

16. The solar energy collector of claim 1, wherein said partially evacuated tubular members are evacuated to a partial pressure at least equal to that associated with a formation temperature of the tubes upon closure.

17. The solar energy collector of claim 1, wherein said partially evacuated tubular members are evacuated to a partial pressure ranging from about 350 Torr to about $10^{-6}$ Torr.

18. The solar energy collector of claim 1, wherein said tubular members exhibit high thermal resistance circumferentially, such that energy collected by said absorber has restricted escape potential through conductive circumferential paths in said tubular members.

19. The solar energy collector of claim 1, wherein said absorber surface includes: a coating exhibiting selective absorbtive and emissive properties such that in an energy range corresponding to incident solar radiation, absorbtion of said energy is relatively high and in an energy range corresponding to infra-red energy, emission by radiation is relatively low.

20. The solar energy collctor of claim 2, wherein said header means comprises: a unitary body of insulating material for each of the opposite transverse free ends of the tubular members, having a transverse opening therein, adapted to mate with corresponding transverse free ends of the tube sheets, forming another flow channel in communication with the flow channel between the tube sheets.

21. The solar energy collector of claim 20, wherein working fluid flows in heat exchange relation with the absorber surface in said flow channel, and said header means has a coupling opening in communication with the transverse opening for providing a flow path through said header for the working fluid, said coupling opening being a corresponding inlet and outlet as determined by flow of said working fluid therethrough.

22. The solar energy collector of claim 21, wherein the coupling opening of the header is longitudinal with said header and is adapted and mated with similar openings of adjacent collector structures for forming a bank of collectors.

23. The solar energy collector of claim 1, wherein said means for joining the lateral free ends of the first tube sheet to the adjacent lateral free end of the other comprises: a partially evacuated tubular transition member, being bonded in lateral contact with and extending laterally from one transverse free end of the tube sheets to the other, said transition member being aligned so as to space one tube sheet from the other.

24. A solar energy collector structure comprising:
a plurality of partially evacuated tubular members, substantially transparent to incident solar radiation, said tubular members being arranged in a first group and lying adajcent one another in parallel axial alignment, means for joining each tubular member next to each adjacent tubular member of the group to form a self-supporting tube sheet structure;
a second group of partially evacuated tubular members, having opposed lateral ends joined as said first group to form a second tube sheet structure, said second group of tubular members being substantially opaque to incident solar radiation, and said opaque second tube sheet forming an absorber surface for intercepting and absorbing incident solar radiation, said first and second tube sheets arranged adjacent each other in tandem to form at least one flow channel therebetween, means for joining the lateral free ends of each tube sheet to an adjacent free lateral end of the other for providing closure for and defining limits to a flow channel formed between said tube sheets.

25. The solar energy collector of claim 24 wherein said second group of tubular members and said absorber surface comprises: a black glass composition.

26. A method of fabricating a solar collector comprising: forming a plurality of tubular members, arranging said tubular members into first and second groups lying adjacent one another in parallel axial alignment, joining lateral ends of adjacent ones of said tubular members to the other for each respective group of tubular members to form respective first and second tube sheet structures, arranging said first and second tube sheet structures in tandem, joining opposite lateral free ends of one tube sheet to corresponding opposite lateral free ends of the other tube sheet, forming at least one flow channel between the tube sheets by so joining said respective lateral free ends, partially evacuating said tubular members of said first and second tube sheets and disposing an absorber surface in the flow channel for intercepting and absorbing solar energy.

27. The method described in claim 26 wherein forming and evacuating said plurality of tubular members includes the step of drawing said tubular members from relatively high viscosity formable molten glass, thermoplastic material closing said tubular members at a relatively elevated temperature while still formable, and allowing said tubular members to cool such that partial pressure within said tubular members is at least less than approximately 350 Torr.

28. The method described in claim 26 wherein joining said tubular members into tube sheet structures comprises the steps of: drawing the tube sheets as a unitary structure from a furnace outlet having an appropriate profile.

29. The method described in claim 26 wherein forming, arranging, and joining said tubular members comprises the steps of: drawing said tubular members at relatively high temperatures from high viscosity formable thermoplastic material and aligning said tubular members in parallel tangential contact while still in a formable state such that the tubular members become bonded by fusion.

30. The method described in claim 26 wherein joining said tubular members comprises the steps of: sealing each of said tubular member to an adjacent tubular member with glass frit at an elevated temperature.

31. The method described in claim 26 wherein joining said tubular members comprises the steps of: sealing each of said tubular members to an adjacent one with material selected from the group including organic and inorganic binders.

32. The method described in claim 26 further comprising the steps of: forming headers having openings for communication with said flow channels and the transverse free ends of the joined tube sheets and coupling said headers with said joined tube sheets.

33. The method described in claim 32 wherein said headers are formed by moulding.

34. The method described in claim 26 further comprising the steps of: treating surfaces of the tubular members for providing selected optical properties.

35. A solar energy collector structure comprising:
a plurality of partially evacuated tubular members, said tubular members being arranged in a group and lying adjacent one another in parallel axial alignment, means for joining each tubular member next to each adjacent tubular member of the group to form a self supporting structure having at least one flow channel enclosed by intersticies of said tubular members so joined; and
an absorber surface disposed in communication with said flow channel for intercepting and absorbing solar energy incident thereon.

36. A solar energy collector structure comprising:
a plurality of partially evacuated tubular members, at least two of said tubular members being arranged in a first plane and lying adjacent one another in parallel axial alignment, means for joining each tubular member next to at least one adjacent tubular member within such plane to form a self supporting tube sheet structure;
at least one other of said partially evacuated tubular members lying in a second plane forming a second tube sheet structure, said first and second tube sheets arranged adjacent each other in tandem to form at least one flow channel therebetween, means for joining said tube sheets together for providing closure for and defining limits to the flow channel formed between said tube sheets, and
an absorber surface disposed in communication with said flow channel for intercepting and absorbing solar energy incident thereon.

37. A method of fabricating a solar collector comprising:
forming a plurality of tubular members, partially evacuating said tubular members, arranging said tubular members to lie adjacent one another in parallel axial alignment, joining said tubular members together, forming at least one flow channel between the tube sheets by so joining said respective tubular members, said flow channel defined by intersticies of said tubular members, and disposing an absorber surface in communication with the flow channel for intercepting and absorbing solar energy incident thereon.

* * * * *